United States Patent
Zhang et al.

(10) Patent No.: US 10,976,604 B2
(45) Date of Patent: Apr. 13, 2021

(54) DISPLAY PANEL, DRIVING METHOD THEREOF AND DISPLAY DEVICE

(71) Applicant: BOE TECHNOLOGY GROUP CO., LTD., Beijing (CN)

(72) Inventors: Pengju Zhang, Beijing (CN); Mingxing Liu, Beijing (CN); Hao Miao, Beijing (CN); Haiyan Sun, Beijing (CN); Rui Li, Beijing (CN); Hong Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/641,148

(22) PCT Filed: Apr. 24, 2019

(86) PCT No.: PCT/CN2019/084063
§ 371 (c)(1),
(2) Date: Feb. 21, 2020

(87) PCT Pub. No.: WO2019/206180
PCT Pub. Date: Oct. 31, 2019

(65) Prior Publication Data
US 2020/0201118 A1    Jun. 25, 2020

(30) Foreign Application Priority Data
Apr. 26, 2018  (CN) .......................... 201810396196.9

(51) Int. Cl.
*G02F 1/13357*   (2006.01)
*G02F 1/1335*    (2006.01)
*G02F 1/1337*    (2006.01)

(52) U.S. Cl.
CPC ...... *G02F 1/133606* (2013.01); *G02F 1/1337* (2013.01); *G02F 1/13362* (2013.01); *G02F 1/133514* (2013.01)

(58) Field of Classification Search
CPC .................................................. G02F 1/133606
See application file for complete search history.

(56) References Cited

U.S. PATENT DOCUMENTS

| 2007/0057932 A1 | 3/2007 | Shin et al. |
| 2011/0057871 A1 | 3/2011 | Miyashita |

(Continued)

FOREIGN PATENT DOCUMENTS

| CN | 102024427 A | 4/2011 |
| CN | 102213835 A | 10/2011 |

(Continued)

OTHER PUBLICATIONS

First Office Action and English language translation, CN Application No. 201810396196.9, dated Sep. 6, 2019, 14 pp.

(Continued)

*Primary Examiner* — Sang V Nguyen
(74) *Attorney, Agent, or Firm* — Myers Bigel, P.A.

(57) ABSTRACT

A display panel, a driving method thereof, and a display device are described. The display panel includes a first substrate and a second substrate opposite to each other, and a light transmission control layer located between the first substrate and the second substrate. The light transmission control layer includes a first electrode on a side of the first substrate facing the second substrate, a second electrode on a side of the second substrate facing the first substrate, a dispersant between the first electrode and the second electrode, and opaque flake dispersions dispersed in the dispersant. The first electrode and the second electrode are con- (Continued)

figured to form an electric field to control an arrangement state of the flake dispersions in the dispersant.

17 Claims, 5 Drawing Sheets

(56) References Cited

U.S. PATENT DOCUMENTS

| | | | |
|---|---|---|---|
| 2013/0033741 A1* | 2/2013 | Mori | G02F 1/172 |
| | | | 359/296 |
| 2014/0009720 A1 | 1/2014 | Huang | |
| 2014/0055718 A1 | 2/2014 | Li | |
| 2015/0253468 A1* | 9/2015 | Zuo | G02F 1/133528 |
| | | | 349/96 |
| 2017/0200424 A1 | 7/2017 | Xu et al. | |
| 2018/0039071 A1* | 2/2018 | He | G02B 26/005 |
| 2018/0081241 A1* | 3/2018 | Fan | H01L 33/40 |
| 2018/0149897 A1 | 5/2018 | Fan | |
| 2019/0265556 A1 | 8/2019 | Miao et al. | |
| 2020/0201118 A1 | 6/2020 | Zhang et al. | |
| 2020/0225547 A1 | 7/2020 | Zhang et al. | |

FOREIGN PATENT DOCUMENTS

| | | |
|---|---|---|
| CN | 102646696 A | 8/2012 |
| CN | 103531100 A | 1/2014 |
| CN | 105206644 A | 12/2015 |
| CN | 105785685 A | 7/2016 |
| CN | 108333831 A | 7/2018 |
| CN | 108398812 A | 8/2018 |
| CN | 108445650 A | 8/2018 |
| JP | 2009-276553 A | 11/2009 |
| KR | 10-2007-0087727 A | 8/2007 |
| WO | 2014/175587 A1 | 10/2014 |

OTHER PUBLICATIONS

Second Office Action and English language translation, CN Application No. 201810396196.9, dated Mar. 2, 2020, 11 pp.
Decision on Rejection and English language translation, CN Application No. 201810396196.9, dated May 29, 2020, 23 pp.
Chao-Rong et al., "Real-time observation of template-assisted colloidal aggregation and colloidal dispersion under an alternating electric field", Chinese Physics B, vol. 20, No. 7, Jul. 2011, pp. 078102-1-078102-7.
Kim et al., "Electric fields line up graphene oxide", Nature Materials, vol. 13, Apr. 2014, pp. 325-326.
Shen et al., "Electro-optical switching of graphene oxide liquid crystals with an extremely large Kerr coefficient", Nature Materials, vol. 13, Apr. 2014, pp. 394-399.
Smith, Jr. et al., "Electrostatically Stabilized Metal Oxide Particle Dispersions in Carbon Dioxide", The Journal of Physical Chemistry B, vol. 109, No. 43, Oct. 8, 2005, pp. 20155-20165.

* cited by examiner

DISPLAY PANEL, DRIVING METHOD THEREOF AND DISPLAY DEVICE

CROSS REFERENCE TO RELATED APPLICATIONS

The present application is a 35 U.S.C. 371 national stage application of PCT International Application No. PCT/CN2019/084063, filed on Apr. 24, 2019, which claims the benefit of Chinese Patent Application No. 201810396196.9, filed on Apr. 26, 2018, the entire disclosures of which are incorporated herein by reference.

TECHNICAL FIELD

The present disclosure relates to the field of display technologies, and in particular, to a display panel, a driving method thereof, and a display device.

BACKGROUND

In the related art, a liquid crystal display panel generally includes an array substrate and a color filter substrate which are assembled, and a liquid crystal layer sealed between the two substrates. Limited by the polarization characteristics of liquid crystal molecules, a liquid crystal display panel needs to use polarized light for display, so polarizers need to be attached to both sides of the panel. In addition, in order to ensure that the liquid crystal molecules can be arranged along a predetermined direction and form a certain pretilt angle to facilitate the deflection of the liquid crystal molecules under the action of an electric field, a uniform alignment layer needs to be formed on the surfaces of both the array substrate and the color filter substrate.

Therefore, in the conventional liquid crystal display panel, since the backlight must pass through the polarizers and the alignment layer, the transmittance of the backlight is reduced and thus the utilization of the backlight is relatively low. Meanwhile, due to the need to provide polarizers and an alignment layer, the thickness of the display panel is increased, which is contrary to the trend of lightening and thinning of the display device; and the overall structure of the display panel is relatively complicated, which further complicates its manufacturing process.

SUMMARY

In order to solve the problems in the related art, the present disclosure provides a non-liquid crystal display panel, a driving method thereof, and a display device.

According to a first aspect of the present disclosure, there is provided a display panel, comprising: a first substrate and a second substrate opposite to each other; and a light transmission control layer between the first substrate and the second substrate. The light transmission control layer comprises: a first electrode on a side of the first substrate facing the second substrate; a second electrode on a side of the second substrate facing the first substrate; a dispersant between the first electrode and the second electrode; and opaque flake dispersions dispersed in the dispersant, wherein the first electrode and the second electrode are configured to form an electric field to control an arrangement state of the flake dispersions in the dispersant.

In some embodiments of the display panel according to the present disclosure, the light transmission control layer further comprises a plurality of supports between the first substrate and the second substrate, which separate the light transmission control layer into a plurality of light transmission control units, the light transmission control layer comprises a plurality of the first electrodes, which are independent of each other and are respectively in the plurality of light transmission control units in a one-to-one correspondence; and a plurality of second electrodes, which are respectively in the plurality of light transmission control units in a one-to-one correspondence.

In some embodiments of the display panel according to the present disclosure, the second substrate is a color filter substrate.

In some embodiments of the display panel according to the present disclosure, the display panel further comprises a color filter substrate on a side of the second substrate away from the first substrate.

In some embodiments of the display panel according to the present disclosure, the color filter substrate comprises a plurality of color filter blocks arranged in an array, the positions of the plurality of color filter blocks are in one-to-one correspondence with the plurality of light transmission controls units.

In some embodiments of the display panel according to the present disclosure, the flake dispersion is graphene oxide.

In some embodiments of the display panel according to the present disclosure, each of the plurality of light transmission control units comprises a high-frequency voltage generating circuit configured to apply a high-frequency voltage to the first electrode.

In some embodiments of the display panel according to the present disclosure, the high-frequency voltage generating circuit comprises: the first electrode; an inductance electrode between the first electrode and the first substrate; an insulating layer between the first electrode and the inductance electrode; a first switching element configured to transmit a driving signal to the first electrode in response to a first control signal being valid; a second switching element configured to transmit a reference signal to the inductance electrode in response to the first control signal being valid; a third switching element configured to connect one terminal of the inductance electrode to the first electrode in response to a second control signal being valid; and a fourth switching element configured to connect the other terminal of the inductance electrode to the first electrode in response to the second control signal being valid, wherein the first control signal and the second control signal have opposite phases to each other.

In some embodiments of the display panel according to the present disclosure, the inductance electrode has a winding shape and at least partially overlaps with the first electrode.

In some embodiments of the display panel according to the present disclosure, the winding shape comprises a spiral shape or a wave shape.

In some embodiments of the display panel according to the present disclosure, at least one of the first, second, third and fourth switching elements is a thin film transistor.

In some embodiments of the display panel according to the present disclosure, an input terminal of the second switching element is electrically connected to the second electrode.

In some embodiments of the display panel according to the present disclosure, the plurality of second electrodes are independent of each other or electrically connected to each other.

According to a second aspect of the present disclosure, there is provided a driving method of the display panel according to some embodiments of the present disclosure, comprising: applying voltages to the first electrode and the second electrode respectively to form an electric field between the first electrode and the second electrode to control the arrangement state of the flake dispersion in the dispersant.

In some embodiments of the driving method of display panel according to the present disclosure, the applying voltages to the first electrode and the second electrode respectively to form an electric field between the first electrode and the second electrode to control the arrangement state of the flake dispersion in the dispersant comprises: applying a high-frequency voltage to the first electrode and applying a constant voltage to the second electrode to form a high-frequency electric field between the first electrode and the second electrode.

According to a third aspect of the present disclosure, there is provided a driving method of the display panel according to other embodiments of the present disclosure, comprising:

transmitting the driving signal and the reference signal to the first electrode and the inductance electrode respectively in response to the first control signal being valid, so that a capacitance is generated between the first electrode and the inductance electrode, connecting the first electrode to both terminals of the inductance electrode in response to the second control signal being valid, so that the first electrode and the inductance electrode form an oscillating loop to generate a high-frequency voltage on the first electrode; and transmitting a common signal to the second electrode so that a high-frequency electric field is formed between the first electrode and the second electrode to control the arrangement state of the flake dispersions in the dispersant.

In the driving method of the display panel according to some embodiments of the present disclosure, the common signal and the reference signal are one and the same signal.

According to a fourth aspect of the present disclosure, there is provided a display device comprising a backlight module and a display panel according to some embodiments of the present disclosure, wherein a light exit surface of the backlight module faces a first substrate in the display panel.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying creative work.

DETAILED DESCRIPTION OF THE DISCLOSURE

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments in the present disclosure, all other embodiments obtained by a person of ordinary skill in the art without creative efforts shall fall within the protection scope of the present invention.

Unless otherwise defined, all terms (comprising technical and scientific terms) used herein have the same meaning as commonly understood by one of ordinary skill in the art to which this disclosure belongs. It will be further understood that terms such as those defined in commonly used dictionaries should be interpreted to have meanings consistent with their meanings in the relevant field and/or context of this specification, and will not be interpreted in an idealized or overly formal sense, unless explicitly so defined in this context.

Herein, the terms "first", "second", and the like are used for descriptive purposes only and cannot be understood as indicating or implying relative importance or implicitly indicating the number of technical features indicated. Thus, features defined using "first", "second", etc. may explicitly or implicitly include one or more of the features. In the description of the embodiments of the present application, unless otherwise stated, "a plurality of" means two or more.

Figure 1:
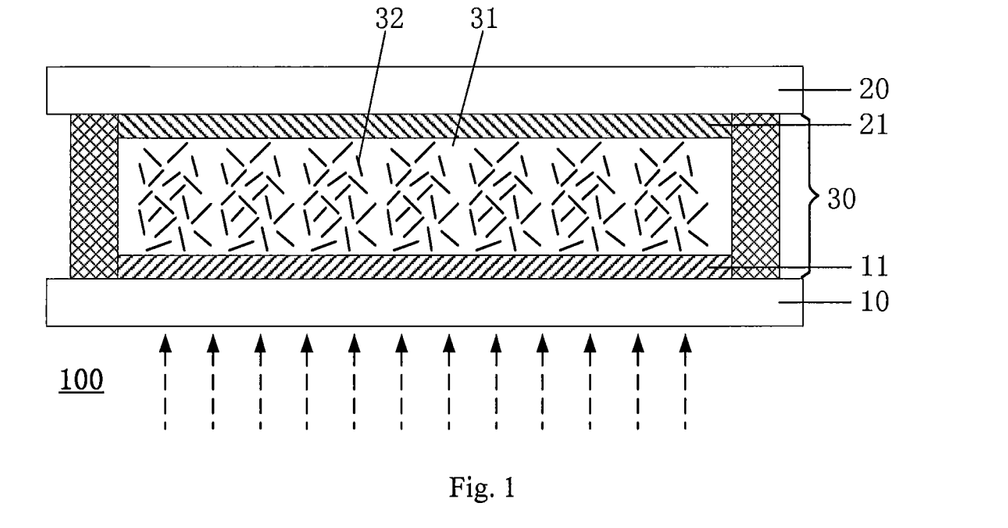
FIG. 1 schematically illustrates a structural diagram of a display panel according to some embodiments of the present disclosure.

FIG. 1 schematically illustrates a structural diagram of a display panel 100 according to some embodiments of the present disclosure. As shown in FIG. 1, a display panel 100 according to some embodiments of the present disclosure includes a first substrate 10 and a second substrate 20 opposite to each other, and a light transmission control layer 30 between the first substrate 10 and the second substrate 20. The light transmission control layer 30 includes: a first electrode 11 on a side of the first substrate 10 facing the second substrate 20; a second electrode 21 on a side of the second substrate 20 facing the first substrate 10; a dispersant 31 between the first electrode 11 and the second electrode 21; and an opaque flake dispersion 32 dispersed in the dispersant 31, wherein the first electrode 11 and the second electrode 21 are configured to form an electric field to control an arrangement state of the flake dispersions 32 in the dispersant 31, thereby adjusting the transmission, in display panel 100, of the light (as shown by the dotted arrow in FIG. 1, that is, the backlight generated by the backlight module) incident on the first substrate 10 from outside the display panel 100. In other words, the display panel 100 according to some embodiments of the present disclosure can use the light transmission control layer 30 to control the degree of backlight transmission, such as the amount, direction, and intensity of light after passing through the display panel 100. Optionally, the backlight may also enter the display panel 100 from the second substrate 20. Hereinafter, for the purpose of explanation, it is assumed that the backlight enters the display panel 100 from the first substrate 10.

In some embodiments according to the present disclosure, since the first electrode 11 is on the first substrate 10 and the opposite second electrode 21 is on the second substrate 20, the electric field formed between the first electrode 11 and the second electrode 21 may be a vertical electric field in a vertical direction with respect to the first substrate 10 and the second substrate 20 in the display panel 100, to control the arrangement state of the flake dispersions 32 in the dispersant 31. It should be noted that FIG. 1 only shows a schematic diagram in which the flake dispersions 32 are arranged in a disorder manner in the dispersant 31 when a vertical electric field is not applied. For the state when a vertical electric field is applied, refer to FIGS. 2A and 2B.

In some embodiments, the first electrode 11 and the second electrode 12 can be made from a transparent conductive material, such as ITO, so as to prevent the backlight transmission from being affected while generating an electric field.

In some embodiments, the dispersant 31 may be a transparent organic liquid or a transparent inorganic liquid to avoid blocking the transmission of the backlight and facilitate freely deflection of the flake dispersion 32 as a light transmission medium to be able to occur in the dispersant 31 under the action of an electric field. The specific material of the dispersant 31 may follow the related art. In addition, the flake dispersion 32 may be made from a non-liquid crystal material, such as graphene oxide. Generally, since the dispersant 31 is a liquid, the dispersant 31 and the flake dispersion 32 therein generally need to be sealed by a sealant or sealed between the first substrate 10 and the second substrate 20 to avoid leakage.

In the display panel 100 shown in FIG. 1 according to some embodiments of the present disclosure, since there is provided the first electrode 11 and the second electrode 21 disposed respectively on the first substrate 10 and the second substrate 20 opposite to each other, the electric field formed by the first electrode 11 and the second electrode 21 is able to control the arrangement state of the flake dispersion 32 in the dispersant 31 and thus to adjust the transmission degree, through the light transmission control layer 30, of light incident on the first substrate 10, to achieve a display function. Compared with the liquid crystal material used as the light transmission medium in the related art, the present disclosure uses a flake dispersion, which is a non-liquid crystal material, as the light transmission medium, so there is no need to provide a polarizer (for offsetting the polarization characteristics of liquid crystal molecules) and an alignment layer (for controlling the liquid crystal molecules to be pre-aligned at a certain angle) in the display panel. In this way, compared with the liquid crystal display panel in related art, since a polarizer and an alignment layer are not required, the display panel according to the present disclosure has a relatively high backlight utilization and a relatively simple overall structure, especially a smaller thickness, so that its manufacturing process is simpler and more consistent with the current user's pursuit of thinning and lightening of the display device.

Figure 2A:
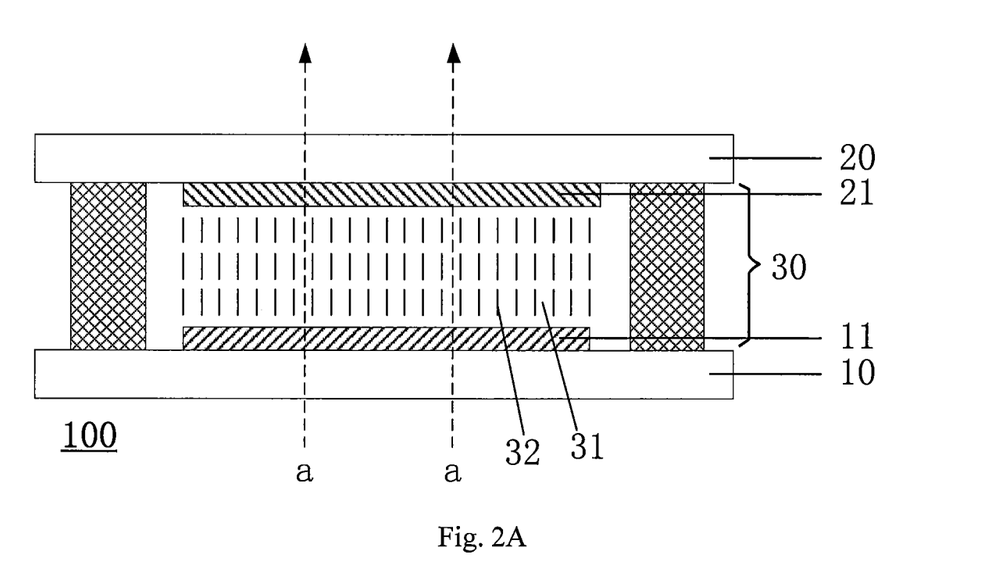
FIGS. 2A and 2B schematically illustrate working state diagrams of a display panel according to some embodiments of the present disclosure.
Figure 2B:
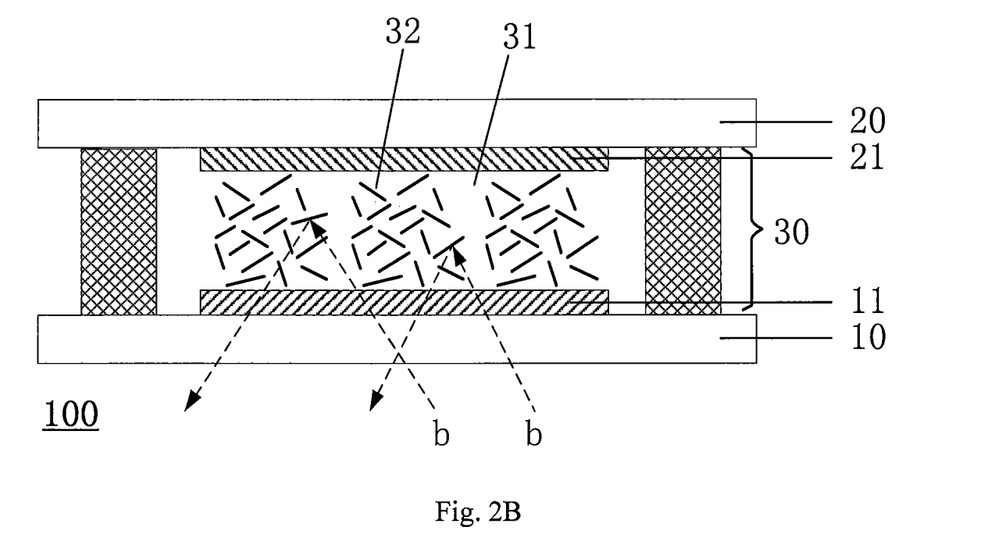

FIGS. 2A and 2B illustrate different working state diagrams of the display panel 100 according to some embodiments of the present disclosure, respectively. As shown in FIG. 2A, when a vertical threshold electric field is applied between the first electrode 11 and the second electrode 21, the flake dispersions 32 are arranged vertically in the dispersant 31. Since the size of the flake dispersions 32 in the thickness direction is much smaller compared to the size of the flake dispersions 32 in the direction of the flake plane, the backlight a, which is directed to the first substrate 10, can pass and exit between the flake dispersions 32 along the vertical direction in which the flake dispersions 32 are aligned, so that vertical light transmission is formed, as shown by the dashed arrows in FIG. 2A. In this case, the display panel 100 is in a bright state, that is, dimming is On. As shown in FIG. 2B, when a vertical electric field is not formed between the first electrode 11 and the second electrode 21, similar to FIG. 1, the flake dispersions 32 are scattered in the dispersant 31. Since the flake dispersions 32 are opaque per se, the backlight b directed to the first substrate 10 can be reflected when incident on the flake plane of the flake dispersion 32 and cannot pass through the display panel 100, as shown by the dotted arrow in FIG. 2B. In this case, the display panel 100 is in a dark state, that is, the dimming is Off.

Further, by adjusting the magnitude of the vertical electric field between the first electrode 11 and the second electrode 21 opposite to each other, the degree of deflection of the flake dispersions 32 in the dispersant 31 and thus the degree of backlight transmission can be controlled, thereby realizing grayscale display.

In some embodiments, the above-mentioned vertical threshold electric field refers to the electric field intensity of the vertical electric field formed between the first electrode 11 and the second electrode 21 (that is, the voltage difference between the first electrode 11 and the second electrode 21), which enables all (or almost all) flake dispersions 32 in the light transmission control layer 30 deflect to the vertical direction. The threshold electric field is related to parameters such as the size of the flake plane of the flake dispersion 32, the dispersion concentration of the flake dispersion 32 in the dispersant 31, and the thickness of the light transmission control layer 30. The specific value of the vertical threshold electric field is not limited in the embodiments of the present disclosure.

In the display panel 100 according to some embodiments of the present disclosure, the flake dispersion 32 (i.e., the light transmission medium) may be a two-dimensional conductive material, such as graphene oxide. Since the driving voltage of graphene oxide is lower than the driving voltage for driving liquid crystal deflection in a conventional liquid crystal display panel, the display panel 100 using graphene oxide as a light transmission medium consumes less energy; meanwhile, the cost of graphene oxide is also much lower than that of liquid crystal material.

Figure 3:
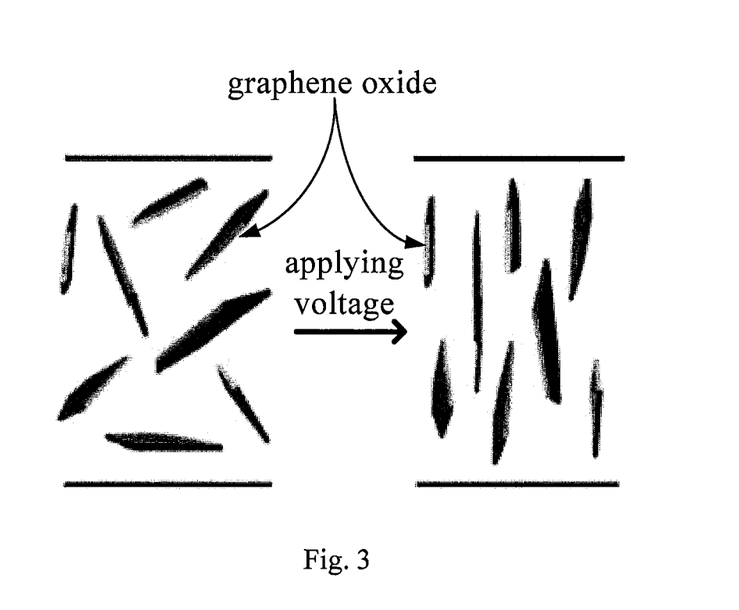
FIG. 3 schematically illustrates an alignment principle diagram of graphene oxide as a flake dispersion in a display panel according to some embodiments of the present disclosure under the action of an electric field.

FIG. 3 schematically illustrates an alignment principle diagram of graphene oxide as a flake dispersion in a display panel according to some embodiments of the present disclosure under the action of an electric field. As shown in FIG. 3, similar to FIGS. 2A and 2B, in the display panel, the graphene oxide is in a scattered arrangement state before applying voltages (left side of FIG. 3), and after applying voltages, it is aligned along the direction of the electric field (right side of FIG. 3) under the action of the electric field, that is, the direction of the flake plane of the graphene oxide is parallel to the direction of the electric field.

There is a certain amount of carboxyl group and hydroxyl group on the surface of graphene oxide. After the carboxyl group and the hydroxyl group are hydrolyzed, the molecular surface has a certain amount of negative charge, and the electrostatic repulsion between the molecules can cause it to exhibit a nematic phase in the liquid. That is to say, when an external electric field is applied to graphene oxide, its surface will generate a surface current along the long axis (i.e., its two-dimensional plane direction), which will cause it to be deflected by the electric field and eventually stably parallel to the direction of the electric field, that is, so that the direction of the flake plane of graphene oxide is aligned along the direction of the electric field. In this way, by applying a vertical electric field and adjusting the voltage, the deflection state of graphene oxide in the dispersant can be controlled and thus the backlight transmittance can be controlled.

Figure 4A:
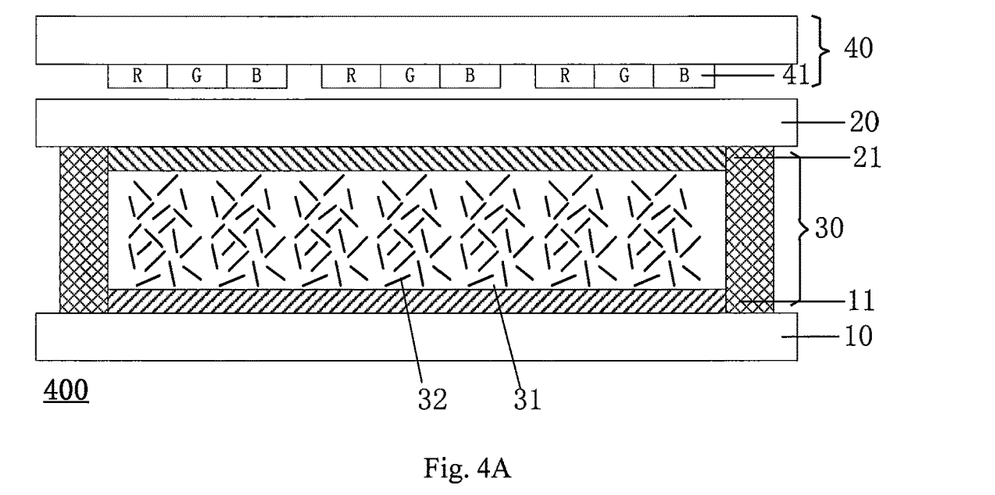
FIGS. 4A and 4B schematically illustrate structural diagrams of a display panel according to other embodiments of the present disclosure.
Figure 4B:
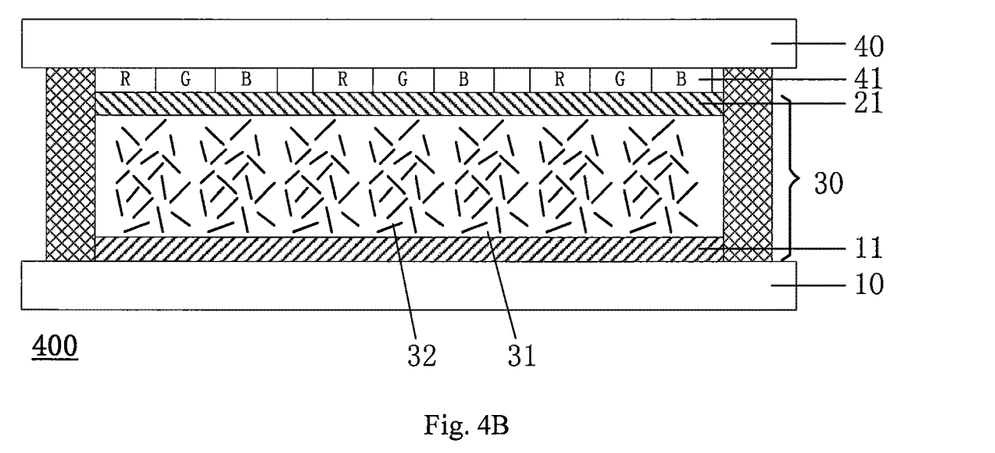

FIGS. 4A and 4B schematically illustrate structural diagrams of a display panel 400 according to other embodiments of the present disclosure. As shown in FIGS. 4A and 4B, the display panel 400 can be used with a color filter substrate 40 to achieve color display. FIGS. 4A and 4B illustrate different implementations of the color filter substrate 40 in the display panel 400 respectively.

As shown in FIG. 4A, compared with the display panel 100 shown in FIG. 1, the display panel 400 further includes a color filter substrate 40 disposed on a side of the second substrate 20 away from the first substrate 10. The color filter substrate 40 may include a color filter layer As shown in FIG. 4B, the second substrate 20 in FIG. 1 can be directly replaced with or made into a color filter substrate 40 to package the light transmission control layer 30 to form the display panel 400, thereby simplifying the manufacturing process. As shown, the color filter substrate 40 may include a color filter layer 41 disposed between the color filter substrate 40 and the second electrode 21.

It should be noted that, in some embodiments according to the present disclosure, the color filter layer 41 is generally composed of a plurality of color filter blocks arranged in an array. FIG. 4A and FIG. 4B only schematically show R, G, B respectively representing red, green, and blue. The specific colors, numbers, and arrangements of these color filter blocks can follow the related art.

Figure 5A:
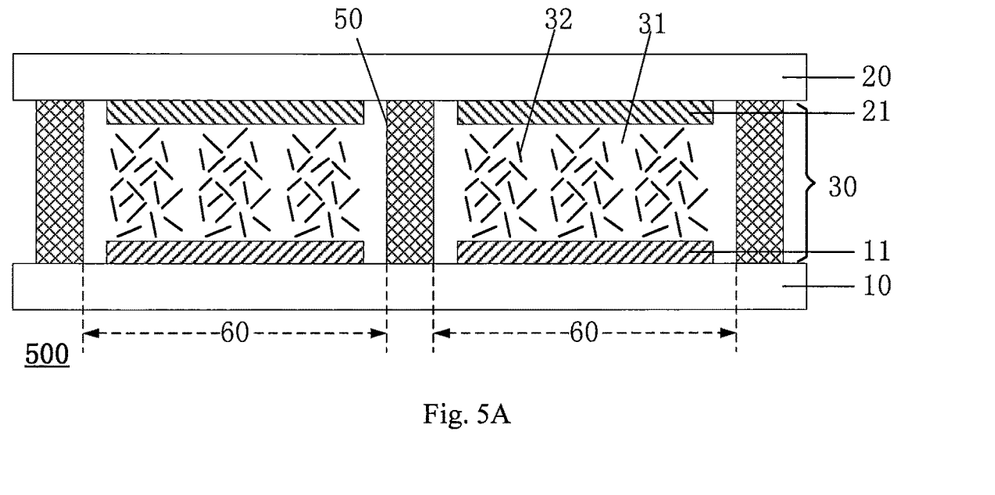
FIGS. 5A and 5B schematically illustrate structural diagrams of a display panel according to yet other embodiments of the present disclosure.
Figure 5B:
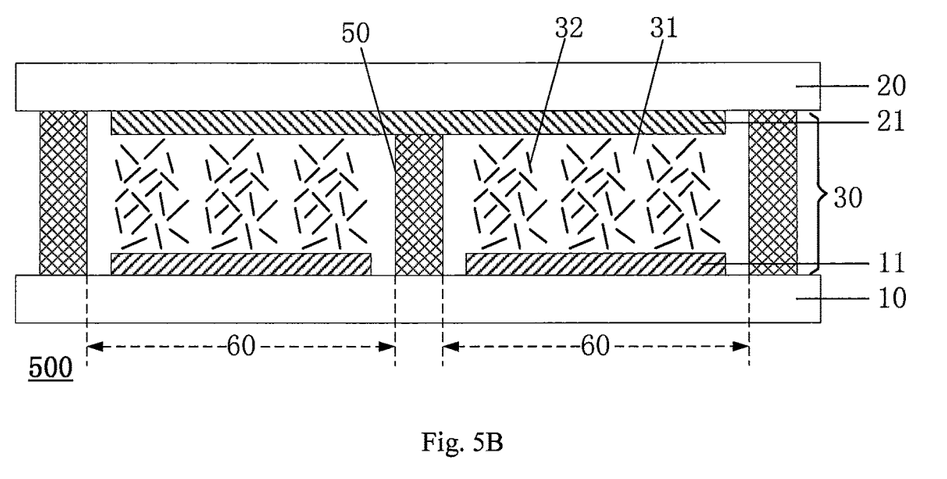

FIGS. 5A and 5B schematically illustrate structural diagrams of a display panel 500 according to yet other embodiments of the present disclosure. As shown in FIG. 5A, compared with FIG. 1, the display panel 500 further includes: a plurality of supports 50 disposed between the first substrate 10 and the second substrate 20, which separate the light transmission control layer 30 into a plurality of light transmission control units 60; and the display panel 500 includes a plurality of first electrodes 11, which are independent of each other and are located respectively in the plurality of light transmission control units 60 in a one-to-one correspondence; similarly, the display panel 500 includes a plurality of second electrodes 20, which are located respectively in the plurality of light transmission control units 60 in a one-to-one correspondence.

It can be understood that the supports 50 shown in FIGS. 5A and 5B can both play a supporting role between the first substrate 10 and the second substrate 20 and encapsulate the light transmission control units 60, and can also longitudinally (in a direction perpendicular to the first substrate 10 and the second substrate 20) separate the optical transmission control layer 30 into a plurality of light transmission control units 60. Similar to pixel units of a liquid crystal display panel, each of the plurality of such light transmission control units 60 can achieve independent control of backlight transmission, thereby forming a plurality of small display areas in which the display effects can be independently controlled and thus improving the quality (such as display resolution) of the displayed picture of the display panel 500. The specific number of the light transmission control units 60 may be flexibly set according to parameters such as the size of the above-mentioned display panel 500 and the display resolution to be achieved.

In some embodiments, in each light transmission control unit 60, the first electrode 11 may also be referred to as a pixel electrode, and the opposite second electrode 21 may be referred to as a common electrode.

In some embodiments, the plurality of second electrodes 20 included in the light transmission control units 60 in one-to-one correspondence can be independent of each other like the first electrodes 10, as shown in FIG. 5A. However, as shown in FIG. 5B, the second electrodes 20 in the light transmission control units 60 may be electrically connected together to form a whole, i.e., an integrated structure formed by interconnections of the plurality of second electrodes 21. This has the advantage that the same common signal or reference signal can be input to the plurality of second electrodes 21 connected to each other, and a respective driving signal can be input to each independent first electrode 11. That is, a separate electric field may be formed in each light transmission control unit 60 so that each light transmission control unit 60 can individually control the arrangement state of the flake dispersion 32 in the dispersant 31 to achieve independent light transmission control of different display regions.

Figure 6:
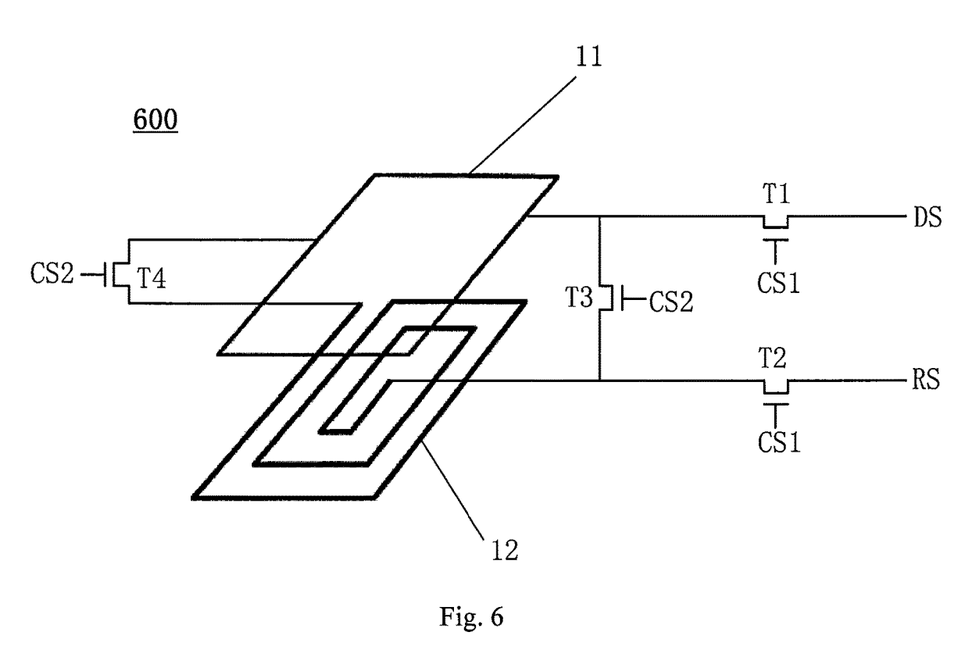
FIG. 6 schematically illustrates a structural diagram of a high-frequency voltage generating circuit in a display panel according to some embodiments of the present disclosure.

In some embodiments according to the present disclosure, the color filter layer 41 in the color filter substrate 40 shown in FIGS. 2A and 2B may include a plurality of color filter blocks arranged in an array, and the positions of the plurality of color filter blocks are in one-to-one correspondence with the plurality of light transmission control units 60, so as to facilitate each light transmission control unit 60 to independently control the color of the backlight. Optionally, it is also possible to set one color filter block to correspond to the plurality of light transmission control units 60. The specific setting manner may be flexible, which is not limited in the embodiments of the present disclosure. FIG. 6 schematically illustrates a structural diagram of a high-frequency voltage generating circuit 600 in a display panel according to some embodiments of the present disclosure.

In a display panel according to some embodiments of the present disclosure, when graphene oxide is used as a light transmission medium or a flake dispersion, the graphene oxide is dispersed in a dispersant to form a suspension in a light transmission control layer. In order to better control the dispersion of the suspension, prevent the agglomeration of graphene oxide molecules, and avoid the reduction reaction of the functional groups on the surface of graphene oxide under the action of direct current, which affects the deflection under the action of a vertical electric field, it is necessary to generate a high-frequency electric field in the light transmission control layer.

In some embodiments of the display panel according to the present disclosure, a high-frequency electric field may be generated by applying a high-frequency voltage to the first electrode and a corresponding constant voltage to the second electrode, and thus a dedicated circuit may be provided to apply a high-frequency voltage to the first electrode.

In some embodiments of the display panel according to the present disclosure, the light transmission control layer or the light transmission control unit may include a high-frequency voltage generating circuit 600 for applying a high-frequency voltage to the first electrode. In some embodiments, the so-called "high-frequency" in the high-frequency voltage or high-frequency electric field refers to a high-frequency AC voltage or AC electric field, and the periodic units of the changes of the direction and intensity therein are usually above the order the order of KHz (kilohertz).

As shown in FIG. 6, a high-frequency voltage generating circuit 600 in a display panel according to some embodiments of the present disclosure includes: a driving signal terminal DS for receiving a driving signal, a reference signal terminal RS for receiving a reference signal, a first control signal terminal CS1 for receiving a first control signal, and a second control signal terminal CS2 for receiving a second control signal; and a first electrode 11, a inductance electrode 12 between the first electrode 11 and a first substrate (not shown), an insulating layer (not shown) between the first electrode 11 and the inductance electrode 12, a first switching element T1, a second switching element T2, a third switching element T3, and a fourth switching element T4. The first switching element T1 is configured to transmit a driving signal to the first electrode 11 in response to a first control signal; the second switching element T2 is configured to transmit a reference signal to the inductance electrode 12 in response to the first control signal; the third switching element T3 is configured to connect one terminal of the inductance electrode 12 to the first electrode 11 in response to a second control signal; and the fourth switching element T4 is configured to connect the other terminal of the inductance electrode 12 to the first electrode 11 in response to the second control signal, wherein the first control signal and the second control signal have opposite phases to each other.

In some embodiments of the high-frequency voltage generating circuit 600 according to the present disclosure, in order to avoid affecting a vertical electric field formed between the first electrode 11 and the second electrode 21, the inductance electrode 12 may be disposed between the first electrode 11 and the first substrate.

In some embodiments, to generate the inductance L, as shown in FIG. 6, the shape of the inductance electrode 12 may be a winding shape. The winding shape may include, for example, a wave shape or a spiral shape (also referred to as a serpentine winding shape) shown in FIG. 6, where the wave shape may be an arc wave or a rectangular wave etc. The specific shape of the inductance electrode 12 is not limited in the embodiments of the present disclosure, as long as the inductor L can be formed on the inductance electrode 12.

In some embodiments, at least one of the switching elements T1-T4 in the high-frequency voltage generating circuit 600 shown in FIG. 6 may be a thin film transistor (TFT). In addition, the inductance electrode 12 may be made from a source/drain layer metal that forming structures such as a source and a drain of each TFT and a data line.

In some embodiments, as shown in FIG. 6, in the high-frequency voltage generating circuit 600, the first electrode 11 and the inductance electrode 12 may be at least partially overlapped with each other, so that a capacitance C is generated between the first electrode 11 and the inductance electrode 12.

In the high-frequency voltage generating circuit 600 according to some embodiments of the present disclosure, the reference signal terminal RS may be connected to a second electrode (i.e., a common electrode), and receives a common signal as a reference signal. In other words, the input terminal of the second switching element T2 can be electrically connected directly to the second electrode, so that the common signal input on the second electrode can be written into the inductance electrode 12 as a reference signal. Further, the manner of electrically connecting the input terminal of the second switching element T2 to the second electrode includes, but is not limited to, connecting by a conductive adhesive located near a peripheral edge in a space between the first substrate 10 and the second substrate 20.

In some embodiments according to the present disclosure, the working process of the high-frequency driving circuit 600 shown in FIG. 6 is as follows.

First, in response to the first control signal being valid, the first switching element T1 and the second switching element T2 are turned on at the same time, and the driving signal and the reference signal are written into the first electrode 11 and the inductance electrode 12 respectively, so that a capacitance C is generated between the first electrode 11 and the inductance the electrodes 12. Here, an example of the driving signal may be a data signal, for example, a high level; an example of the reference signal may be a common signal, for example, a low level. As described above, the first switching element T1 and the second switching element T2 can be controlled using a control signal generated by one and the same control electrode. For example, when the above switching elements are transistors, the gates of the first switching element T1 and the second switching element T2 are both connected to the same gate line to receive the same first control signal, thus the first switching element T1 and the second switching element T2 are turned on and off simultaneously.

Subsequently, after the charging of capacitor C is completed, in response to the second control signal being valid (that is, the first control signal is invalid, since the first control signal and the second control signal have opposite phases to each other), the first switching element T1 and the second switching element T2 are turned off, while the third switching element T3 and the fourth switching element T4 are turned on, so that the first electrode 11 and the inductance electrode 12 form an oscillation circuit.

In some embodiments, the third switching element T3 and the fourth switching element T4 may be controlled using one and the same control electrode. For example, when the third switching element T3 and the fourth switching element T4 are transistors, their gates are connected to the same gate line, so that the third switching element T3 and the fourth switching element T4 are turned on and off simultaneously.

Here, if the first switching element T1, the second switching element T2, the third switching element T3, and the fourth switching element T4 are turned on at the same time, an LC oscillation circuit cannot be formed. Therefore, the first switching element T1, the second switching element T2, and the third switching element T3, the fourth switching element T4 form a NOT-gate structure. That is, when the first switching element T1 and the second switching element T2 are turned on, the third switching element T3 and the fourth switching element T4 are turned off; otherwise, when the first switching element T1 and the second switching element T2 are turned off, the third switching element T3 and the fourth switching element T4 are turned on.

The principle of the LC oscillation circuit is to use the energy storage characteristics of capacitors and inductors, so that the electrical energy and magnetic energy are alternately converted, that is to say, there will be a maximum and minimum value of electrical energy and magnetic energy, which will cause oscillation. In the process of generating an oscillating current in the oscillation circuit, the charges on the capacitor composed of the first electrode 11 and the inductance electrode 12, the current transmitting through the coil, and the magnetic field and electric field associated with the current and charge undergo periodic changes. In this way, when the LC oscillation circuit generates oscillation, the potential and polarity of the first electrode 11 are periodically changed, that is, a high-frequency (usually up to the order of KHz) voltage with a very fast periodic change is generated. When a corresponding voltage (such as a constant common voltage) is applied to the second electrode 21 opposite to the first electrode 11, the magnitude of the vertical electric field generated between the first electrode 11 and the second electrode 21 and the direction of the field strength (from bottom to top or from top to bottom) keep changing, that is, a high-frequency driving electric field is generated to drive the deflection of graphene oxide, thereby avoiding agglomeration and oxidation reaction of graphene oxide that may occur due to the vertical electric field that is always in the same magnitude and field strength direction during the display process.

In the high-frequency voltage generating circuit according to the present disclosure, the oscillation frequency of the generated LC oscillation circuit can be designed and adjusted by the values of L and C to meet the specific frequency requirements for charging and discharging the first electrode 11.

According to some embodiments of the present disclosure, a driving method of a display panel according to some embodiments of the present disclosure is provided. As described above with reference to the display panel 100 of FIG. 1, the driving method of the display panel may include: applying voltages to the first electrode and the second electrode respectively to form an electric field between the first electrode and the second electrode to control the arrangement state of the flake dispersion in the dispersant in the display panel 100. Thus, the transmission, in the display panel 100, of the light (shown by the dotted arrow in FIG. 1, which is the backlight generated by the backlight module) from outside the display panel 100 to the first substrate 10 is adjusted, so that the display effect of the display panel 100 is controlled.

In the driving method of the display panel according to some embodiments of the present disclosure, as described above, when graphene oxide is used as the light transmission medium, the step of applying voltages to the first electrode and the second electrode respectively to form an electric field between the first electrode and the second electrode to control the arrangement state of the flake dispersion in the dispersant includes: applying a high-frequency voltage to the first electrode and applying a constant voltage to the second electrode to form a high-frequency electric field between the first electrode and the second electrode. This can better control the dispersion of the suspension, prevent the agglomeration of graphene oxide molecules, and avoid the reduction reaction of functional groups on the surface of graphene oxide under the action of direct current, which affects the deflection under the action of a vertical electric field.

Figure 7:
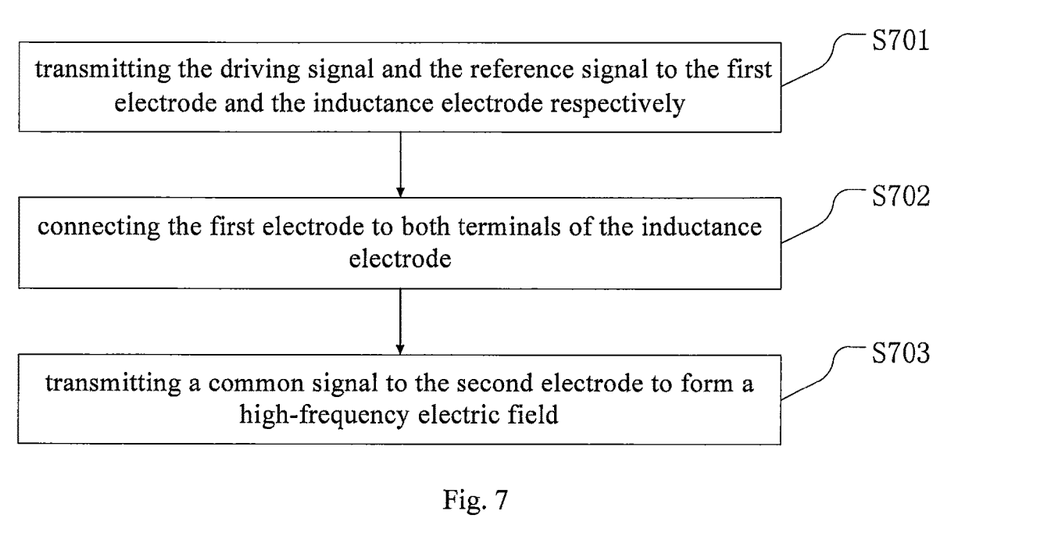
FIG. 7 schematically illustrates a flowchart of a driving method of a display panel according to some embodiments of the present disclosure.

FIG. 7 schematically illustrates a driving method of a display panel including the high-frequency voltage generating circuit 600 shown in FIG. 6 according to some embodiments of the present disclosure. As shown in FIG. 7, the driving method includes:

S701: transmitting the driving signal and the reference signal to the first electrode and the inductance electrode respectively in response to the first control signal being valid so as to generate a capacitance between the first electrode and the inductance electrode;

S702: connecting the first electrode to both terminals of the inductance electrode in response to the second control signal being valid, so that the first electrode and the inductance electrode form an oscillating loop to generate a high-frequency voltage on the first electrode, wherein the first control signal and the second control signal have opposite phases; and S703: transmitting a common signal to the second electrode, so that a high-frequency electric field between the first electrode and the second electrode is formed.

In some embodiments, the above-mentioned common signal and the reference signal may be the same signal.

Figure 8:
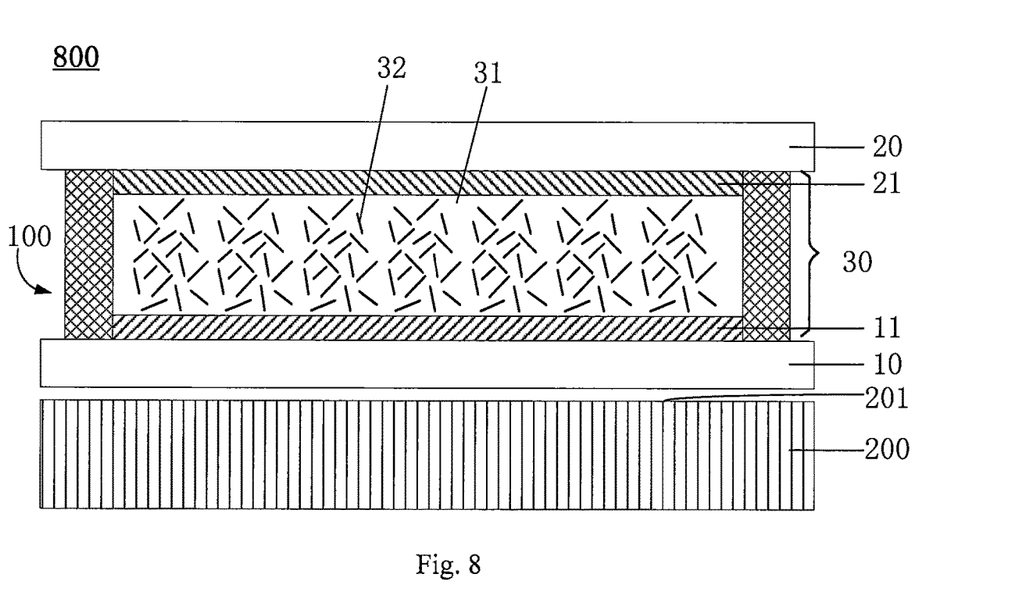
FIG. 8 schematically illustrates a structural diagram of a display device according to some embodiments of the present disclosure.

FIG. 8 schematically illustrates a display device 800 according to some embodiments of the present disclosure. As shown in FIG. 8, the display device 800 includes a backlight module 200 and a display panel 100 according to some embodiments of the present disclosure. The light exit surface 201 of the backlight module 200 faces the first substrate 10 in the display panel 100.

In some embodiments, the backlight module 200 mainly includes light-emitting components, light guide plates (or diffuser plates), optical films, and glue frames. A light guide plate (or diffuser plate) is used to convert the point (line) light source emitted by the light-emitting component into an area light source and enable exit of the light. An optical film is arranged above the light guide plate (or diffuser plate) and is mainly divided into two types. One type is a diffusion film and a reflection film, which are used to enhance the light emitting uniformity of the area light source; the other is a brightness enhancement film, which is used to improve the light output brightness of a backlight module. A glue frame is used to fix the above structures. Specific structures can follow the related art.

The above descriptions are only specific implementations of the present disclosure, but the scope of protection of the present disclosure is not limited thereto. Various modifications and variations that can be easily conceived by those skilled in the art in the technical scope disclosed in this disclosure shall be covered within the protection scope of this disclosure. Therefore, the patent protection scope of the present disclosure should be defined by the claims.

The invention claimed is:

1. A display panel comprising:
    a first substrate and a second substrate opposite to each other; and
    a light transmission control layer between the first substrate and the second substrate,
    wherein the light transmission control layer comprises:
        a first electrode on a side of the first substrate facing the second substrate;
        a second electrode on a side of the second substrate facing the first substrate;
        a dispersant between the first electrode and the second electrode;
        flake dispersions in the dispersant; and
        a high-frequency voltage generating circuit configured to apply a high-frequency voltage to the first electrode, the high-frequency voltage comprising an AC voltage of which a frequency of periodic changes of direction and intensity are above an order of KHz,
    wherein the flake dispersions are opaque and comprise graphene oxide,
    wherein the first electrode and the second electrode are configured to form an electric field to control an arrangement state of the flake dispersions in the dispersant,
    wherein the high-frequency voltage generating circuit comprises:
        the first electrode;

an inductance electrode between the first electrode and the first substrate;

an insulating layer between the first electrode and the inductance electrode;

a first switching element configured to transmit a driving signal to the first electrode in response to a first control signal being valid;

a second switching element configured to transmit a reference signal to the inductance electrode in response to the first control signal being valid;

a third switching element configured to connect a first terminal of the inductance electrode to the first electrode in response to a second control signal being valid; and a fourth switching element configured to connect a second terminal of the inductance electrode to the first electrode in response to the second control signal being valid, wherein the first control signal and the second control signal have opposite phases to each other.

2. The display panel according to claim 1, wherein the light transmission control layer further comprises a plurality of supports between the first substrate and the second substrate, which separate the light transmission control layer into a plurality of light transmission control units, and wherein the light transmission control layer comprises a plurality of first electrodes comprising the first electrode, which are independent of each other and are respectively in the plurality of light transmission control units in a one-to-one correspondence, a plurality of second electrodes comprising the second electrode, which are respectively in the plurality of light transmission control units in a one-to-one correspondence, and a plurality of high-frequency voltage generating circuits comprising the high-frequency voltage generating circuit, which are respectively in the plurality of light transmission control units in a one-to-one correspondence.

3. The display panel according to claim 2, wherein the second substrate comprises a color filter substrate.

4. The display panel according to claim 2, wherein the display panel further comprises a color filter substrate on a side of the second substrate away from the first substrate.

5. The display panel according to claim 3, wherein the color filter substrate comprises a plurality of color filter blocks arranged in an array, and wherein positions of the plurality of color filter blocks are in one-to-one correspondence with the plurality of light transmission control units.

6. The display panel according to claim 1, wherein the inductance electrode has a winding shape and at least partially overlaps the first electrode.

7. The display panel according to claim 6, wherein the winding shape comprises a spiral shape or a wave shape.

8. The display panel according to claim 1, wherein at least one of the first, second, third, and fourth switching elements is a thin film transistor.

9. The display panel according to claim 1, wherein an input terminal of the second switching element is electrically connected to the second electrode.

10. The display panel according to claim 2, wherein the plurality of second electrodes are independent of each other or electrically connected to each other.

11. A driving method for the display panel according to claim 1, comprising:

applying voltages to the first electrode and the second electrode respectively to form an electric field between the first electrode and the second electrode to control the arrangement state of the flake dispersions in the dispersant.

12. The driving method according to claim 11, wherein the applying voltages to the first electrode and the second electrode respectively comprises:

applying a high-frequency voltage to the first electrode and applying a constant voltage to the second electrode to form a high-frequency electric field between the first electrode and the second electrode.

13. A driving method for the display panel according to claim 1, comprising:

transmitting the driving signal and the reference signal to the first electrode and the inductance electrode respectively in response to the first control signal being valid, so that a capacitance is generated between the first electrode and the inductance electrode;

connecting the first electrode to both terminals of the inductance electrode in response to the second control signal being valid, so that the first electrode and the inductance electrode form an oscillating loop to generate a high-frequency voltage on the first electrode; and transmitting a common signal to the second electrode so that a high-frequency electric field is formed between the first electrode and the second electrode to control the arrangement state of the flake dispersions in the dispersant.

14. The driving method according to claim 13, wherein the common signal is same as the reference signal.

15. A display device comprising:

the display panel according to claim 1; and a backlight module, wherein a light exit surface of the backlight module faces the first substrate in the display panel.

16. The display panel according to claim 4, wherein the color filter substrate comprises a plurality of color filter blocks arranged in an array, and wherein positions of the plurality of color filter blocks are in one-to-one correspondence with the plurality of light transmission control units.

17. A driving method for the display panel according to claim 2, comprising:

applying voltages to the first electrode and the second electrode respectively to form an electric field between the first electrode and the second electrode to control the arrangement state of the flake dispersions in the dispersant.

* * * * *